(12) United States Patent
Sites et al.

(10) Patent No.: US 10,673,876 B2
(45) Date of Patent: Jun. 2, 2020

(54) SYSTEMS AND METHODS FOR DETERMINING INDIVIDUAL AND GROUP RISK SCORES

(71) Applicant: KnowBe4, Inc., Clearwater, FL (US)

(72) Inventors: Eric Sites, Clearwater, FL (US); Greg Kras, Dunedin, FL (US); Alin Irimie, Clearwater, FL (US); Stu Sjouwerman, Belleair, FL (US); Marcio Castilho, Palm Harbor, FL (US); Siegfried Martens, Tampa, FL (US); Eric Bonabeau, Tampa, FL (US); Kristian Kime, Tampa, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 16/413,021

(22) Filed: May 15, 2019

(65) Prior Publication Data

US 2019/0356679 A1 Nov. 21, 2019

Related U.S. Application Data

(60) Provisional application No. 62/672,390, filed on May 16, 2018, provisional application No. 62/672,386, filed on May 16, 2018.

(51) Int. Cl.
*H04L 29/06* (2006.01)

(52) U.S. Cl.
CPC ........ *H04L 63/1416* (2013.01); *H04L 63/14* (2013.01); *H04L 63/1408* (2013.01); *H04L 63/1425* (2013.01); *H04L 63/1433* (2013.01)

(58) Field of Classification Search
CPC ........ G06F 21/50; G06F 21/55; G06F 21/552; H04L 63/14; H04L 63/1408;
(Continued)

(56) References Cited

U.S. PATENT DOCUMENTS

| 7,599,992 B2 | 10/2009 | Nakajima |
| 8,041,769 B2 | 10/2011 | Shraim et al. |

(Continued)

FOREIGN PATENT DOCUMENTS

WO  WO-2016/164844 A1  10/2016

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

(Continued)

*Primary Examiner* — Edward Zee
(74) *Attorney, Agent, or Firm* — Foley & Lardner LLP

(57) ABSTRACT

Embodiments disclosed herein describe a server, for example a security awareness server or an artificial intelligence machine learning system that establishes a risk score or vulnerable for a user of a security awareness system, or for a group of users of a security awareness system. The server may create a frequency score for a user, which predicts the frequency at which the user is to be hit with a malicious attack. The frequency score may be based on at least a job score, which may be represented by a value that is based on the type of job the user has, and a breach score that may be represented by a value that is based on the user's level of exposure to email.

16 Claims, 7 Drawing Sheets

(58) Field of Classification Search
CPC ............. H04L 63/1416; H04L 63/1433; H04L 63/1441; H04L 63/145; H04L 63/1466; H04L 63/1483

See application file for complete search history.

(56) References Cited

U.S. PATENT DOCUMENTS

| | | |
|---|---|---|
| 8,464,346 B2 | 6/2013 | Barai et al. |
| 8,484,741 B1 | 7/2013 | Chapman |
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 2007/0142030 A1 | 6/2007 | Sinha et al. |
| 2008/0288330 A1* | 11/2008 | Hildebrand ............ G06Q 10/06 705/7.28 |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0126729 A1* | 5/2017 | Oberheide .......... H04L 63/1433 |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |

OTHER PUBLICATIONS

Palka et al., "Dynamic phishing content using generative grammars," Software Testing, Verification and Validation Workshops (ICSTW), 2015 IEEE Eighth International Conference, Date of Conference:Apr. 13-17, 2015,IEEE Xplore, pp. 1-8.

* cited by examiner

_300_

```
Determine a frequency score to predict a frequency at which a
user is to be hit with a malicious attack
302
```

```
Determining a propensity score that identifies a propensity of
the user to respond to the hit of the malicious attack
304
```

```
Determining a severity score that identifies a severity of the
user's response to the hit of the malicious attack
306
```

```
Establishing a risk score for the user based at least on the
frequency score, the severity score and the propensity score
308
```

```
Based on the risk score, displaying a probability that the user
will respond to a subsequent hit of a type of malicious attack at
a point in time
310
```

*Fig.3*

SYSTEMS AND METHODS FOR DETERMINING INDIVIDUAL AND GROUP RISK SCORES

RELATED APPLICATIONS

This patent application claims the benefit of and priority to U.S. Provisional Patent Application No. 62/672,386, titled "SYSTEMS AND METHODS FOR CALCULATING METRICS IN A SECURITY AWARENESS SYSTEM," and filed May 16, 2018, and also claims the benefit of and priority to U.S. Provisional Patent Application No. 62/672,390, titled "SYSTEMS AND METHODS FOR DETERMINING INDIVIDUAL AND GROUP RISK SCORES," and filed May 16, 2018, the contents of all of which are hereby incorporated herein by reference in its entirety for all purposes

FIELD OF THE DISCLOSURE

This disclosure generally relates to determination of vulnerability scores for malicious cyberattacks using artificial intelligence, and to systems and methods for calculating metrics in a security awareness system while ensuring that the results of simulated phishing attacks are attributed to the correct user.

BACKGROUND OF THE DISCLOSURE

It can be useful to perform simulated phishing attacks on an individual or set of individuals for the purposes of extracting information from a device used by the individuals. A phishing attack involves an attempt to acquire sensitive information such as usernames, passwords, credit card details, etc., often for malicious reasons, possible by masquerading as a trustworthy entity. For example, an email may be sent to a target, the email having an attachment that performs malicious actions when executed or a link to a webpage that either performs malicious actions when accessed or prompts the user to execute a malicious program. Malicious actions may include malicious data collection or actions harmful to the normal functioning of a device on which the email was activated, or any other malicious actions capable of being performed by a program or a set of programs.

A method of performing simulated phishing attacks is as follows. A target is defined as the user for whom the simulated phishing attack is directed, i.e. the user that is being tested. A simulated phishing message is sent to the target's address. The message can masquerade as a message from a party known to the target, such as an executive of the company that employs the target. In some embodiments, the message can appear to be sent from a party unknown to the target. The message may be designed to appear interesting to the target and may make an offer or promise e.g. access to an interesting tidbit of news, access to useful computer software, access to knowledge of how to perform a money-making scheme, or any other thing that may be of interest. In some implementations, the message may request that the target perform a certain action, such as providing sensitive information by replying to the message or transferring money to an account owned by the attacker and then sending a reply message to confirm that the money has been transferred. The message may request the target to perform any action that could result in a security breach if the simulated phishing message was a real phishing message.

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose weaknesses in the security infrastructure meant to protect users and/or devices from phishing attacks or other computerized, cyber, or digital attacks. It may also expose a lack of vigilance and/or know-how in a user or set of users of a device in minimizing risk associated with such attacks. This can allow a security manager to pinpoint specific issues to be resolved and to bolster security as appropriate. A simulated phishing attack may be performed by e.g. a security manager, or by a third party on behalf of a security manager.

BRIEF SUMMARY OF THE DISCLOSURE

A server, for example a security awareness server or an artificial intelligence machine learning system may establish a risk score or vulnerable for a user of a security awareness system, or for a group of users of a security awareness system. The server may create a frequency score for a user, which predicts the frequency at which the user is to be hit with a malicious attack. The frequency score may be based on at least a job score, which may be represented by a value that is based on the type of job the user has, and a breach score that may be represented by a value that is based on the user's level of exposure to email.

The server may also determine a propensity score that identifies the propensity of the user to respond to the hit of the malicious attack. A predictive model with an input of the user's history of whether or not the user responded with a type of response for a given hit of the malicious attack may be trained and the propensity score may be based on the training of this model.

The server may also determine a severity score that identifies how severe the outcome is of the user's response to the hit of the malicious attack. The severity score may be based on the job score of the user, and may also be based on how much access the user has, for example to critical systems and servers of their organization.

Based on the frequency score, the propensity score, and the severity score, the server may establish a risk score for the user. The risk score model may be a function of these three scores, and the function may be a weighted function or logarithmic function of these three scores. A group score can be calculated based on a function of risk scores of each user within the group of users.

Based on at least the risk score, the server may display a probability that the user will respond to a subsequent hit of a type of malicious attack at a point in time. Information contained in a security awareness system may be combined with information from external sources and used collectively to profile a user or group of users' past behavior. This profile may be then used to predict a user's future behavior. Where a user's overall vulnerability can be characterized, a system may pro-actively act to protect the user, the system, or the organization from actions that the user may make in the future. Accordingly, new systems and methods for determine vulnerability scores are needed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts one embodiment of a method for calculating risk scores;

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes an artificial intelligence network and environment which may be useful for practicing embodiments described herein.

Section C describes embodiments of systems and methods determining vulnerability scores for malicious cyberattacks, for example using artificial intelligence as part of a security awareness system.

A. Computing and Network Environment

Figure 1A:
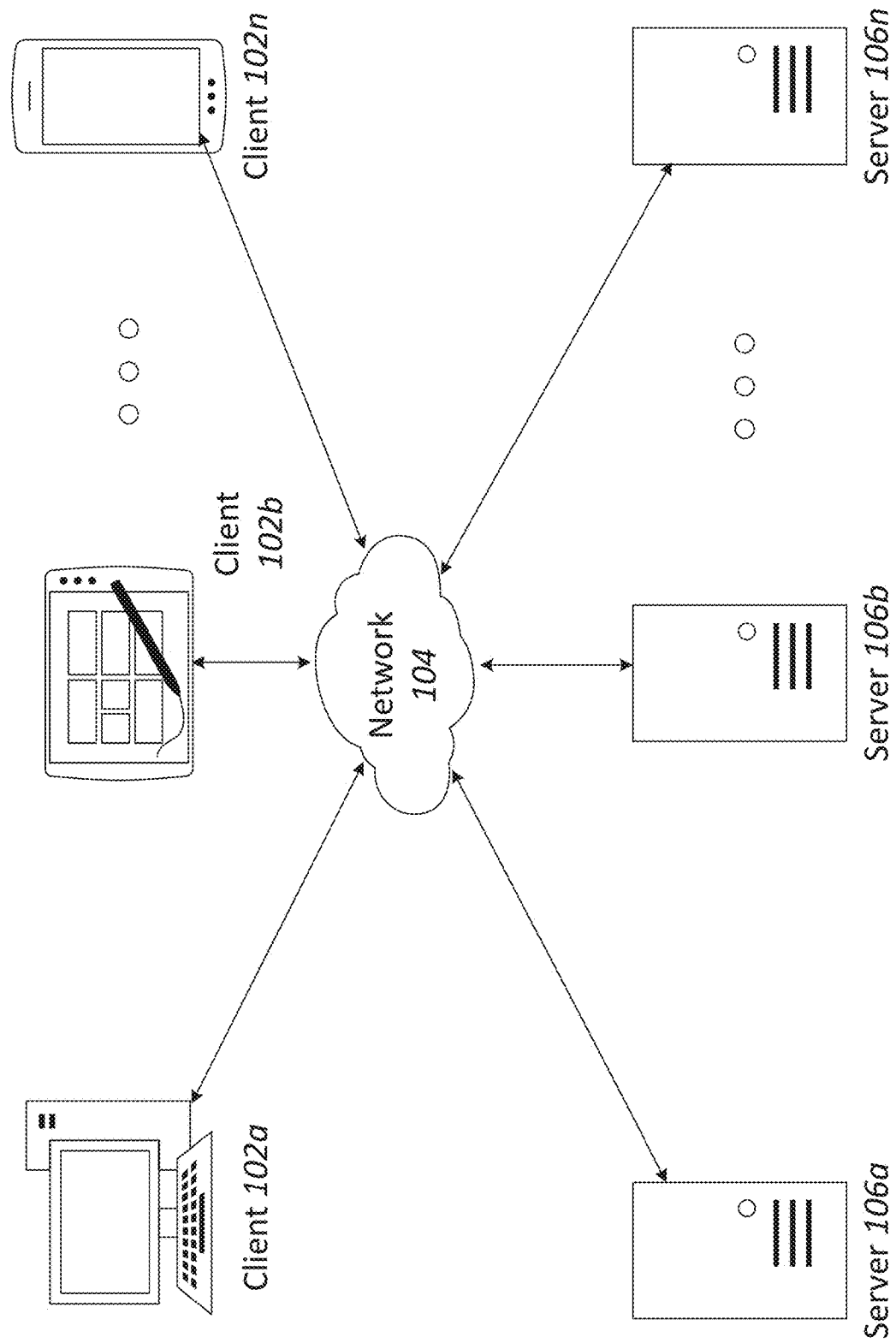
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
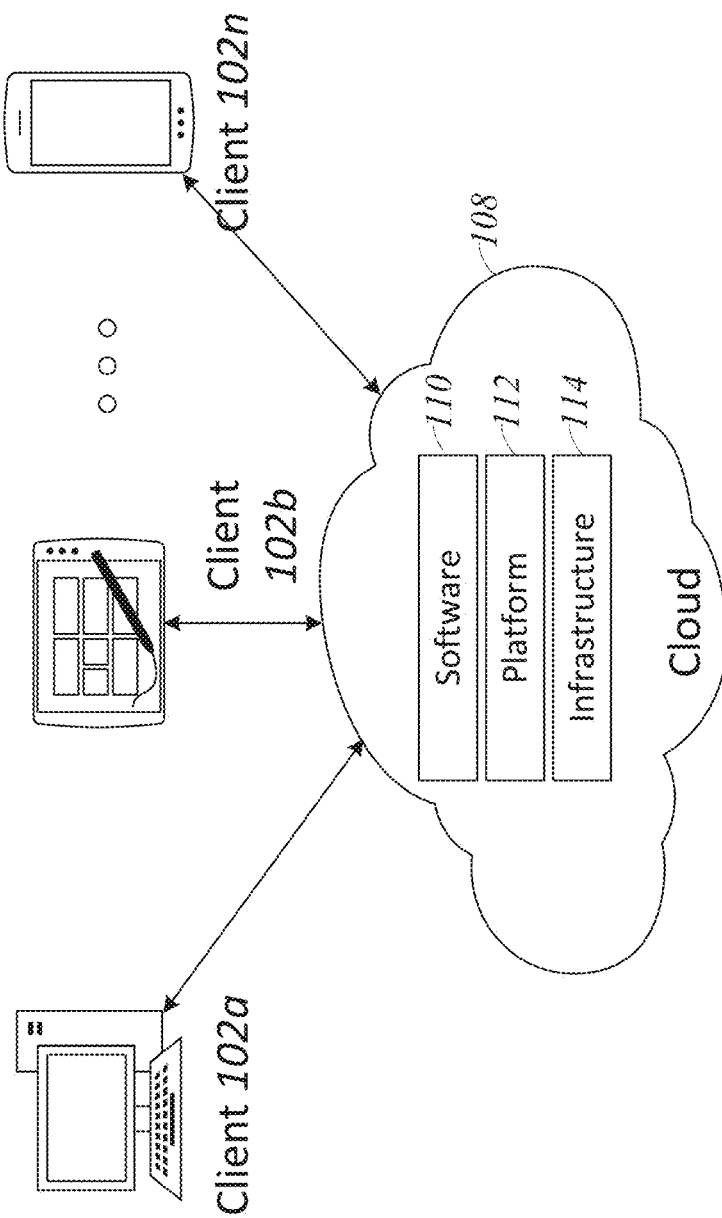
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
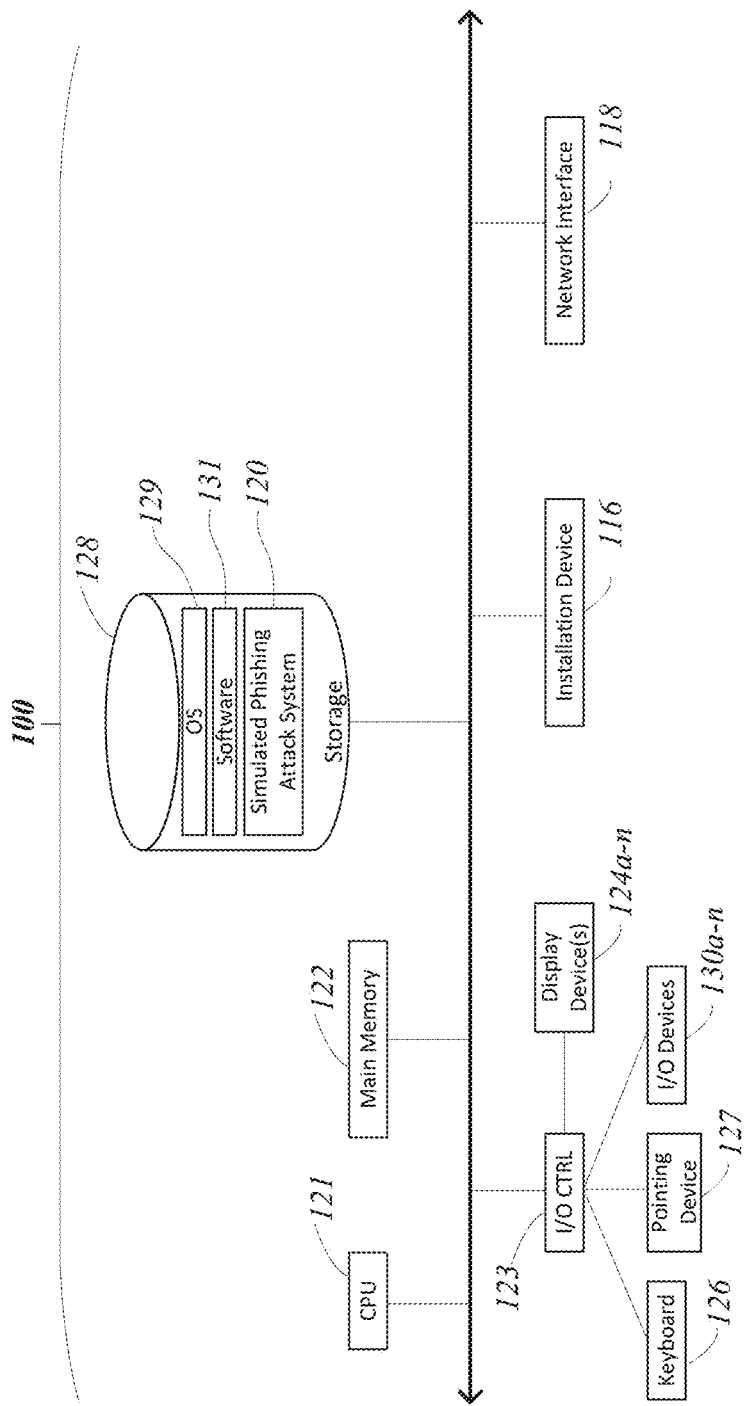
FIGS. 1C and 1D are block diagrams depicting embodiments of computing devices useful in connection with the methods and systems described herein.
Figure 1D:
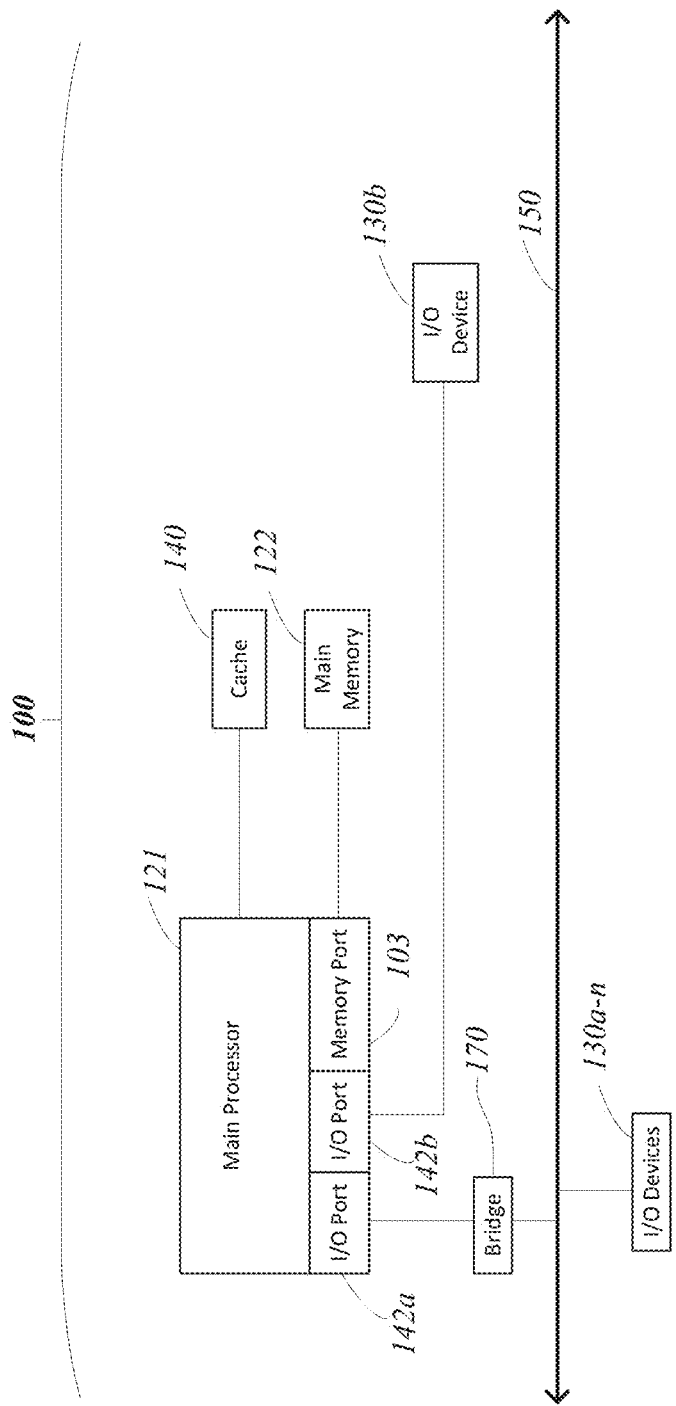

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random-access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search, and ALEXA by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Artificial Intelligence (AI) Network and Environment

An intelligent agent is any system or device that perceives its environment and takes actions to maximize its chances of success at some goal. The term artificial intelligence is used when a machine mimics cognitive functions such as learning and problem solving. One of the tools used for artificial intelligence is neural networks. Some exemplary types of artificial neural networks may be used for artificial intelligence and machine learning are feedforward neural network-artificial neuron, radial basis function neural network, kohonen self organizing neural network, recurrent neural network, convolutional neural network and modular neural network. Examples of other artificial intelligence algorithms and machine learning models include reinforced learning, logistic regression, statistical regression, decision trees, linear regression and naïve bayes classified algorithms. Although the term 'neural network' is used in the description of the technology in this disclosure, it is to be understood that any type of artificial intelligence algorithm, whether or not classified as an artificial neural network, may be used to enable the present technology.

Neural networks are modeled after the neurons in the human brain, where a trained algorithm determines an output response for input signals. The main categories of neural networks are feedforward neural networks, where the signal passes only in one direction, and recurrent neural networks, which allow feedback and short-term memory of previous input events.

A wide variety of platforms has allowed different aspects of AI to develop. Advances in deep artificial neural networks and distributed computing have led to a proliferation of software libraries, including Deeplearning4j, which is open-source software released under Apache License 2.0 and supported commercially by Skymind of San Francisco, Calif., and TensorFlow, an artificial intelligence system which is open-source released under Apache License 2.0, developed by Google, Inc.

Deep learning comprises an artificial neural network that is composed of many hidden layers between the inputs and outputs. The system moves from layer to layer to compile enough information to formulate the correct output for a given input. In artificial intelligence models for natural language processing, words can be represented (also described as embedded) as vectors. Vector space models (VSMs) represent or embed words in a continuous vector space where semantically similar words are mapped to nearby points (are embedded nearby each other). Two different approaches that leverage VSMs are count-based methods and predictive methods. Count-based methods compute the statistics of how often some word co-occurs with its neighbor words in a large text corpus, and then maps these count-statistics down to a small, dense vector for each word. Predictive models directly try to predict a word from its neighbors in terms of learned small, dense, embedding vectors.

Neural probabilistic language models are traditionally trained using the maximum likelihood (ML) principle to maximize the probability of the next word given previous words (or context) based on the compatibility of the next word with the context. The model is trained by maximizing its log-likelihood on a training set. The objective is maximized when the model assigns high probabilities to the words which are desired (the real words) and low probabilities to words that are not appropriate (the noise words).

A framework is provided that allows an artificial intelligence machine learning system to create risk scores, which are a representation of vulnerability to a malicious attack. In some embodiments, the learned values from a neural network may also be serialized on disk for doing the inference step at a later time. These learned values may be stored in multidimensional arrays that also contain shape and type information while in memory.

C. Systems and Methods for Creating Vulnerability Scores

The following describes systems and methods of creating vulnerability scores, for example using artificial intelligence, for use in a security awareness system.

A simulated phishing attack may test the readiness of a security system or users of a system to handle phishing attacks such that malicious actions are prevented. A simulated phishing attack may, for example, target a large number of users, such as employees of an organization. A target is defined as the user for whom the simulated phishing attack is directed, i.e. the user that is being tested. A simulated phishing message is sent to the target's address. The message can masquerade as a message from a party known to the target, such as an executive of the company that employs the target. In some embodiments, the message can appear to be sent from a party unknown to the target. The message may be designed to appear interesting to the target and may make an offer or promise e.g. access to an interesting tidbit of news, access to useful computer software, access to knowledge of how to perform a money-making scheme, or any other thing that may be of interest. In some implementations, the message may request that the target perform a certain action, such as providing sensitive information by replying to the message or transferring money to an account owned by the attacker and then sending a reply message to confirm that the money has been transferred. The message may request the target to perform any action that could result in a security breach if the simulated phishing message was a real phishing message.

In some implementations, each message sent to a target may include a unique identifier. For example, a unique identifier may be a series of numbers and/or letters, or a unique string of characters included in the subject of the message, in the body of the message, or in the message headers. In some other examples, the unique identifier may be a unique message address, for example in either the "To", "From:" or the "Cc:" field of an email. In still other examples, the unique identifier may be included within a separate file that is attached to the email.

The unique identifier can help to determine the identity of a user who was first sent the simulated phishing message. In implementations in which the unique identifier is included within the subject line of the simulated attack message, the body of the simulated attack message, in the message headers of the simulated phishing message or in a file attached to the simulated phishing message, if the message is forwarded by the target or by any other user, the forwarded message may also include the unique identifier within the subject, the body, the message headers or in the attachment of the original simulated phishing message that is forwarded along with the message. In implementations in which the unique identifier is included within the subject line of the simulated phishing message, the body of the simulated phishing message, or in the message headers of the simulated phishing message, the reply message can be processed to extract the unique identifier from the subject line of the simulated phishing message, the body of the simulated phishing message, or in the message headers of the simulated phishing message. The unique identifier can be used to identify the target of the simulated phishing message, regardless of which user ultimately sends the simulated phishing message back to the security awareness system. Thus, even if the simulated phishing message received at the system is sent from an address that is not known to be associated with a particular target, the unique identifier can help to determine the identity of the target of the simulated phishing message.

In implementations in which the unique identifier is included within an email address in the "To:", "From:" or "Cc:" fields of the simulated phishing message, a reply to the simulated phishing message sent by the target, for example from a different address associated with the target, may also include the unique identifier within the "From:", "To:" or "Cc:" fields respectively. The reply message can be processed to extract the unique identifier as discussed above, and the unique identifier can be used to determine the identity of the target of the original email, even if the reply simulated phishing message is sent from a different address than the address that the security awareness system sent the original simulated phishing message to. Sending a reply message in response to receiving a simulated phishing message can be classified as a failure. In embodiments, forwarding a received simulated phishing message can be classified as a failure. Therefore, the security awareness system must be able to identify the original target of the simulated phishing message. Once the identity of the target has been determined, a record of the target's failure can be stored.

A system can be configured to derive a measure of potential risk, individualized for each user. In embodiments, a vulnerability score (also called a risk score) will be based on machine-learned predictive analytics and will represent how vulnerable an organization's users are.

In some examples, the risk score derivation will be based on training history, phishing history, responses to simulated phishing tests, demographic information, information about the organization, breach data, user assessment surveys and data which may be obtained from a SIEM. User assessment surveys may include questions such as, "Under which of the following circumstances is it acceptable to share a password with a co-worker?". The system may present multiple choice answers for the user to choose from. The returned information gets interpreted as a strength or weakness, and may be used to determine specific training or simulated phishing templates to send the user. Other questions focus on a user's perceived confidence in different areas. In embodiments, questions focus on a user's attitude towards, and knowledge of specific security risks or situations. In embodiments, the system takes responses to user assessments into account in determining the best way to target that user or test their knowledge on a specific topic.

In some embodiments, a risk score framework is created, which outlines the data that is considered in creating the risk score such as the frequency a user receives phishing attacks, the severity of those attacks, and the method of calculating the risk score. In some embodiments, a variety of data sources may be considered in creating the risk score. In some examples, records reflecting user responses to real and simulated phishing attacks may considered in creating the risk score. The sophistication of the user's response to various real and simulated phishing attacks may be considered in creating the risk score. In some examples, the sophistication of the user's response to various real and simulated phishing attacks may be given a score or a ranking, for example, a user's response may be given a score from 0 or 1, representing the least sophisticated response, to 5, representing the most sophisticated response, and the score or ranking of the user's response to various real and simulated attacks may be considered in creating the risk score. In embodiments, user training records considered in creating the risk score. For example, the training that the user has completed, the time spent engaged in training activities, the duration of the training modules that the user has completed, and other details related to the training or learning related to malicious attacks that the user has undertaken may be considered in creating the risk score.

In some embodiments, user demographics are integrated as sources of data that considered in creating the risk score. For example, the user's age, gender, and tenure at a current job may be considered in creating the risk score. In some embodiments, the user's organizational unit, job title, and manager may be considered in creating the risk score. In some examples, the user's membership in distribution lists or groups may be taken into consideration in calculating the risk score. In embodiments, information about data breaches related to the user or to the organization may be considered in creating the risk score. The aforementioned are non-limiting examples of the types of data related to a user that may be considered in creating the risk score. In embodiments, the data may be integrated into data sets used to train machine learning models, the machine learning models configured to predict user responses to malicious attacks based on the integrated data. In some embodiments, data collection is performed on an ongoing basis, and updated data and/or data sets may be used to re-train machine learning models or create new machine learning models that evolve as the data changes.

In embodiments, the risk score of an individual may be represented as:

$$\text{Risk Score } (RS) = f\{f(H), p(R|H), s(R,H)\} = RS(f, p, s)$$

where:
H=a hit, de fined as any kind of malicious attack
f(H)=frequency of potential harmful hits H
p(R|H)=the propensity that an individual will respond to a hit H
R=individual response, e.g. a click, reply, etc.
s(R,H)=the severity of the impact of response R to hit H
subject to constraints:

$$RS(0,0,0) \geq 0$$

$$RS(1,1,1) = 100$$

In some embodiments, RS(f, p, s) is an increasing function of each of its variables: f, p, and s.

In some embodiments, responses can include a multitude of user actions, for example but not limited to a user opening a message, clicking on a link in a message, replying to a message, opening an attachment to a message, enabling a macro in a message, entering data in response to a message, reporting a message, or forwarding a message. In some examples, data about responses may be aggregated, or temporal information may be included, for example the number of days since a user last responded, or how many instances of each type of response (or any type of response) in the last e.g. 30 days, 3 months, 1 year, etc.

In some embodiments, the training and learning history of a user may be partitioned based on the type of course or module that the user performed. In some examples, the training history may be divided into short modules (less than a predetermined duration) or long modules (greater than a predetermined duration). In some examples, training history may be divided based on the type of training, for example classroom training or online training. Training history may include courses that the user is enrolled in by the system, courses that the user has chosen to enroll in voluntarily, courses that the user has started, or courses that the user has completed. Training history may include the time interval between completed training courses.

In some embodiments, user data may be arranged in a tabular format, whereby the rows of the table represent a phish instance for a user which may include a detailed representation of the user and their phishing and training history at a given point of time. In some embodiments, when training a risk score model, the system uses information in a table to learn how the user responded to a specific attack given their history at the time of the attack.

The first component of the risk score calculation is f(H), which reflects the frequency at which individuals are hit with a malicious attack (H). In some embodiments, this information is based on two proxies in the data, job score and breach score. In some embodiments, job score may be defined as follows:

Job Score (job title)=$J$=(0,5,6,10)

where:
0=does not match a category or no information available
5=accounting or IT
6=high level, e.g. manager, director, lead
10=executive, e. g. CxO
It is understood that these example job classifications are demonstrative, and any job classifications may be used, and more or fewer job scores may be enabled.

In some embodiments, a breach score may be based on an email exposure check (EEC) threat level, for example a breach score may be defined as follows:

Breach Score (EEC)=$B$=(0,3,10)

where:
0=the user has negligable email exposure
3=the user has moderate email exposure
10=the user has high email exposure
It is understood that these example breach scores are demonstrative, and any breach scores may be used, and more or fewer breach scores may be enabled.

In some embodiments, breach score information may be decayed over time. In some examples, the data supporting the breach score inputs may be sparse, or in some examples the users may not have a job title which fits into any of these categories, in which case f(H) may take on a baseline value.

The first component of the risk score calculation is the severity s(R, H) which reflects the severity of the user response R to malicious attack or hit H. In some embodiments s(R, H) may be a function of individual access. In some embodiments, the severity may be a function of the user's job score. In some embodiments, the severity may by a function of a risk booster value, which may be set by a company or system administrator to customize the assessed risk of individuals or of groups of individuals. In some embodiments, severity score may be defined as follows:

$s(R,H)$=(−1,0,1,10)

where:
−1=below normal risk
0=normal risk (default)
1=elevated risk
10=very high risk
It is understood that these example severity score classifications are demonstrative, and any severity score classifications may be used, and more or fewer severity scores may be enabled.

Although a lot of functions satisfy these criteria, a natural family of candidates would need to convey the multiplicative nature of RS. The components of RS—f, p, and s, represent the expected loss due to malicious attacks over a period of time. The function RS(f, p, s) in some embodiments may be represented as a weighted sum of logarithms:

$RS(f,p,s) = w_1 \log f + w_2 \log p + w_3 \log s$

In some embodiments, the function RS(f, p, s) may be represented as follows:

$$RS(f, p, s) = w_1\log(1 + J + B) + w_2\log(1 + P(R|H)) + \frac{w_3\log\left((1 + J)\left(1.5 + \frac{RB}{2}\right)\right)}{d}$$

where:
$w_i$=settable parameters, normalized so that $0 \leq RS \leq 100$
J=job score (0, 5, 6, or 10)
B=breach score (0, 3, or 10)
RB=severity (s)(−1,0,1,10)
and:

$$d = \frac{\log(21 + 100\log(2) + \log(11 \times 6.5))}{100} = 0.77 \text{ when } w_i = 1$$

In some embodiments, the propensity of RS, p(R|H) represents the predictive model component of the risk score RS. In some examples, this value may be produced by:
a. Training statistical and neural network models to learn the mapping from a particular user history (input features) to whether or not the user responded (response R) on a given malicious attack (H).
b. After repeated exposure to millions of samples, the models are able to learn to predict with some success whether or not users with given malicious attack and training histories are likely to perform a response R given an attack H.
c. Given enough training data, models are able to predict a variety of different user responses R to a variety of different attacks H.

In some embodiments, the model's output, p(R|H) is the probability that a given user will respond, for example click, in response to a malicious attack, for example a phishing email, at a particular point in time. The same user may exhibit a different p at a later time. To evaluate the predictive performance of the model, we need more than one malicious attack, which allows the model to predict the click rate of a user over a period of time and compare it to the user's actual click rate over that period of time. For example, assume the period of time is one year. For each user, calculate the predicted p(R|H) each time a phishing email hits over one year and record whether or not the user clicked. p(R|H) is harder to predict and more variable for users with few phish events. The more phish data that is available about a user, the more accurate the risk score RS becomes. In some embodiments, the performance of the model is assessed by predicting the number of clicks instead of the percentage over a period of time and comparing it to the user's actual clicks over that period of time.

The value of p(R|H) is a very good predictor in the aggregate for a group of users with similar profiles. When users are categorized by their predicted p(R|H) value, the percent of actual clicks in each category closely tracks the predicted p(R|H) value for the category. Uncertainties at the individual level get smaller when groups of individuals are aggregated. The propensity component p(R|H) of the risk score RS becomes more predictive as the number of phish events increases. In some embodiments, this can be achieved by taking multiple events into account for each user. In embodiments, this can be achieved by aggregating the expected click rate at the level of a group. The use of the highest individual risk score in a group at the risk score for the group is not recommended as it puts too much weight on one single estimate. The average over all individual risk scores in the group is one possible approach to aggregating the risk scores, however this may tend to underestimate the contribution of isolated outliers. In some examples, the approach taken may be referred to as using the standard distance to the perfect score (0), described as follows:

$$RS(\text{group}) = \sqrt{\frac{1}{N}\sum_{i=1}^{N}(RS(i)^2)}$$

where:
N=number of group members
RS(i)=individual risk score of member i
As an example, consider the case where N=100, RS(1)=100, and RS(i)=0, i=2: 100. Then, $RS_{max}$=100, $RS_{average}$=1, and $RS_{group}$=10.

In some embodiments, user training histories are used in predicting p(R|H) values. When more users have had training, p(R|H) is low, and when fewer users have had training, p(R|H) is high. In some examples, when users have had training recently, p(R|H) is low.

In some embodiments, several different processes or workflows are involved in the prediction of risk score. In some embodiments, data are divided up into groups, and a percentage of the data is used for training, a percentage of the data is used for validation, and a percentage of the data is used for text. In one examples, 80% of the data is used for training, 10% of the data is used for validation, and 10% of the data is used for test. In some embodiments, data from archived users may be used for any of training, validation or testing of the model. In some embodiments, the model is updated, trained or retrained periodically as new data enters the system. In some embodiments, this may be updated daily, weekly, monthly, or yearly. In some embodiments, users may be added to or removed from groups that are used to train the models. For example, a user may more from one job level to a different job level, and all users of a given job level are being used to train a model for use with that job level. In this example, the user that moved job level would be removed from the group of users used to train, validate or test the model for that job level.

Figure 2:
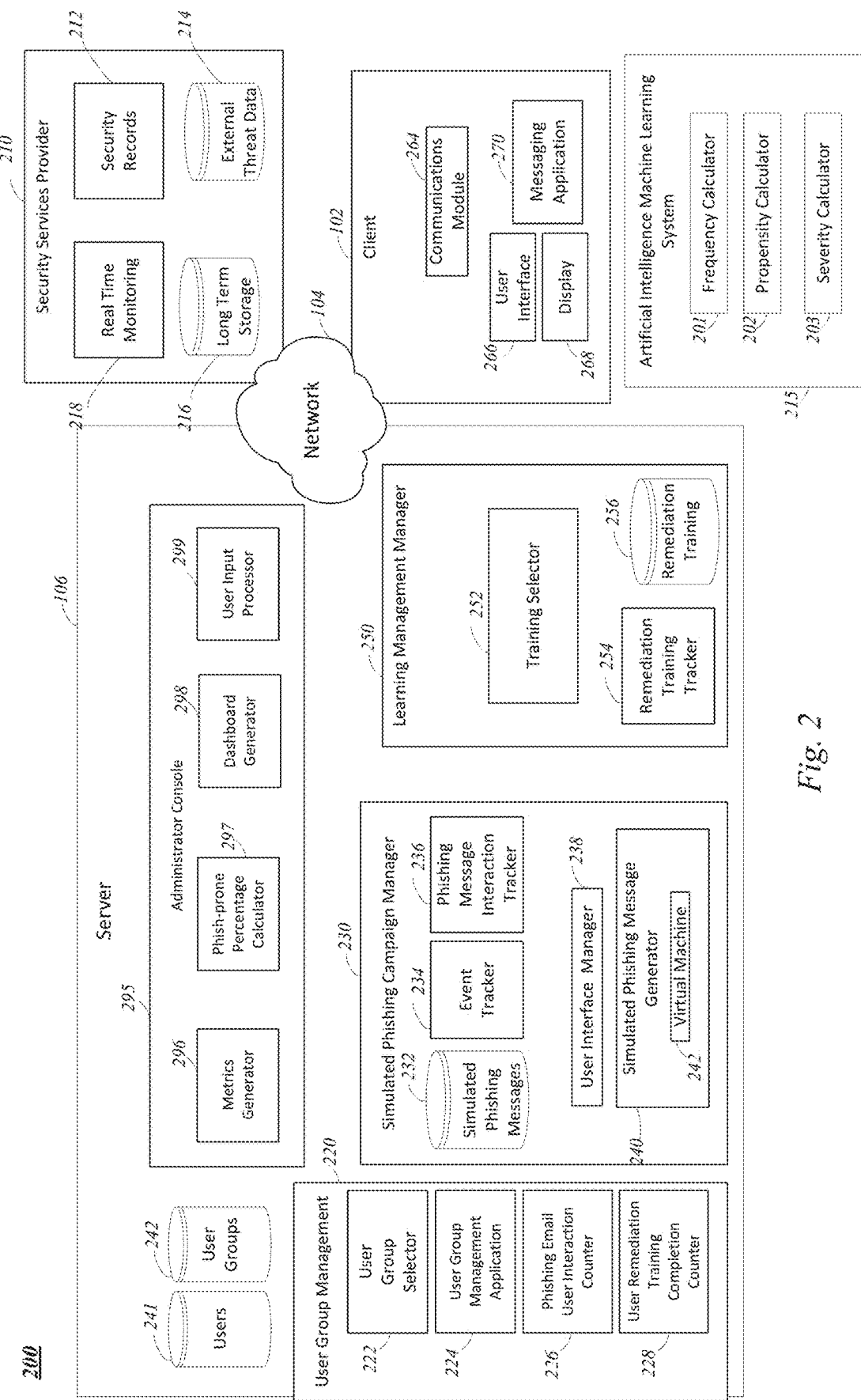
FIG. 2 illustrates some of the architecture of an implementation of a system capable of determining vulnerability scores for malicious cyberattacks using artificial intelligence as part of a security awareness system.

Referring to FIG. 2 in a general overview, FIG. 2 depicts some of the architecture of a security awareness system 200 capable of determining vulnerability scores for malicious cyberattacks using artificial intelligence, and of calculating metrics in a security awareness system while ensuring that the results of simulated phishing attacks are attributed to the correct user.

In some embodiments, system 200 is configured to calculat metrics and/or vulnerability scores and is capable of using calculated metrics and/or vulnerability scores to inform individualized user or group user training. In some embodiments, calculated metrics and/or vulnerability scores may be used to inform individualized and group reporting. In some implementations, the system 200 includes one or more servers 106, one or more clients 102, and one or more security services providers 210. Server 106 may include administrator console 295, while may include metrics generator 296, phish-prone percentage calculator 297, and dashboard generator 298, and user input processor 299. Server 106 may include user group manager 220, which may include user group selector 222, user group management application 224, phishing message user interaction counter 226, and user remediation training completion counter 228. Server 106 may include simulated phishing campaign manager 230, which may include a storage for simulated phishing messages 232, event tracker 234, phishing message interaction tracker 236, user interface manager 238, and simulated phishing message generator 240, which may include virtual machine 242. Server 106 may include learning management manager 250 which may include training selector 252, remediation training tracker 254, and remediation training storage 256. Server 106 may also include storages for users 241 and user groups 242.

System 200 may include client 102, which may include communications module 264, user interface 266, display 268, and messaging application 270. System 200 may also include security services provider 210, which may include real time monitoring 218, security records 212, long term storage 216, and external threat data 214. System 200 may include network 104 allowing communication between these system components.

Referring to FIG. 2 in more detail, simulated phishing campaign manager 230 may be e.g., a security manager, a third-party security consultant, a risk assessor, or any other party. Simulated phishing campaign manager 230 may wish to direct a simulated phishing attack by interacting with user group manager 220 and client 102 through simulated phishing campaign manager 230 installed on a device. The device may be, for example, a desktop computer, a laptop computer, a mobile device, or any other suitable computing device. The simulated phishing campaign manager 230 may be e.g., an application on a device that allows for a user of the device to interact with the simulated phishing campaign manager 230 for e.g. purposes of tailoring and/or executing a simulated phishing attack. Administrator console 295 may allow a user, also known as an administrator, to view and/or process and/or analyze the results of a simulated phishing attack. Administrator console 295 may interact with event tracker 234, phishing message interaction tracker 236, phishing message user interaction counter 226, user remediation training completion counter 228, and remediation training tracker 254 to allow an administrator to view and/or process and/or analyze historical behaviors or users and/or groups with respect to real and simulated phishing attacks. Administrator console 295 may interact with security services provider 210, which may include real time monitoring 218, security records 212, and external threat data 214 that are related to users that are managed by the system 200.

In an implementation, simulated phishing campaign manager 230, when executed on the device, causes e.g. a graphical user interface to be displayed to e.g. the simulated phishing campaign manager 230. In other implementations, the administrator console 295 allows for user input through a non-graphical user interface, e.g. a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a device capable of opening a network connection to simulated phishing campaign manager 230 or to the administrator console 295 or may be any other type of interface.

In an implementation, the simulated phishing campaign manager 230 may make choices concerning how a simulated phishing attack is to be carried out. For example, a graphical user interface run by the administrator console 295 may be displayed to the simulated phishing campaign manager 230 on a display of the device. The simulated phishing campaign manager 230 may input parameters for the attack that affect how it will be carried out. For example, simulated phishing campaign manager 230 may interact with user group manager 220 to make choices as to which users from users storage 241 or which user groups from user groups storage 242 to include as potential targets in the attack. User group manager 220 may control the method of determining which users are to be selected as targets of the attack, and simulated phishing campaign manager 230 may control the timing of various aspects of the attack, whether to use an attack template that includes values for one or a plurality of attack parameters, how responses from targeted users should be uniquely identified, and other choices. These choices may be made by e.g. selecting options displayed on a graphical user interface from dropdown menus, being presented with choices through a simulated attack wizard, or in any other appropriate manner.

In an implementation, the simulated phishing campaign manager 230 may allow the administrator console 295 to access and/or change settings of an account maintained with any party involved with the attack, such as, for example, a third-party security service provider, or a party that manages interactions with a third-party security services provider 210 to access and/or change settings of an account maintained with a third-party security services provider 210. Simulated phishing campaign manager 230 may manage various aspects of a simulated phishing attack. For example, simulated phishing campaign manager 230 may process input from the administrator console 295, may provide access as needed to various applications, modules, and other software components of the security awareness server 106 to other various applications, modules, and other software components of the simulated phishing campaign manager 230, may monitor and control timing of various aspects of a simulated attack, may process requests for access to attack results, or may perform other tasks related to the management of a simulated attack.

In an implementation, system 200 includes a security awareness system server 106. The security awareness system server 106 may be a part of a cluster of servers. In some implementations, tasks performed by the security awareness system server 106 may be performed by a plurality of security awareness system servers. These tasks may be allocated among the cluster of servers by an application, service, daemon, routine, or other executable logic for task allocation. The security awareness system server 106 may include a processor and memory.

In some implementations, simulated phishing campaign manager 230 or administrator console 295 may include a user input processor. The user input processor may receive input from e.g. and administrator using e.g. the administrator console 295 to manage a simulated phishing attack. The user input processor may be, for example, a library, application programming interface (API), set of scripts, or any other code that may be accessed by, or executed via a network connection by, or provide callback methods for, simulated phishing campaign manager 230.

In an implementation, the user input processor may be integrated with the memory. The memory may store data such as parameters and scripts associated with a particular simulated phishing attack. For example, the memory may store a set of parameters and scripts corresponding to the choices made by a simulated phishing campaign manager 230 for a particular simulated phishing attack.

In an implementation, simulated phishing campaign manager 230 includes simulated phishing message generator 240. Simulated message generator 240 may be integrated with the memory so as to provide the simulated phishing message generator 240 accesses to parameters associated with messaging choices made for a particular simulated attack by e.g. the simulated phishing campaign manager 230. The simulated phishing message generator 240 may be an application, service, daemon, routine, or other executable logic for generating messages. The messages generated by simulated phishing message generator 240 may be of any appropriate format. For example, they may be email messages, text messages, messages used by particular messaging applications such as, e.g., WhatsApp™, or any other type of message. Message type to be used in a particular attack may be selected by e.g. a simulated phishing campaign manager 230. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 242 or may simply be run on an operating system of the security awareness system server 106 or may be run in any other appropriate environment.

In some implementations, the simulated phishing message generator 240 may be configured to generate messages having characteristics that facilitate identification of targeted users. In some embodiments simulated phishing message generator 240 may include a unique identifier in each simulated attack message sent to a target. In examples, message application 270 of client 102 may include a unique identifier in each simulated phishing message that client 102 that is the targeted user either replies to or forwards to a different client 102.

In some implementations, each simulated phishing message sent to a target may include a unique identifier. In embodiments, a unique identifier may be a series of numbers and/or letters, or a unique string of characters. In some examples, the unique identifier may be included in the subject of the message or in the body of the message. In embodiments, the unique identifier may be included in the header of the simulated phishing message. In examples, the unique identifier may be a unique email address in either the "From:" field or the "Cc:" field of the email. In still other examples, the unique identifier may be included within a separate file that is attached to the email.

The unique identifier can help to determine the identity of the target user for a simulated phishing message if the user fails the simulated phishing test. In examples, a user who replies to a simulated phishing message is considered by simulated phishing campaign manager 230 to have failed the simulated phishing test. In some embodiments, a user who forwards a simulated phishing message is considered by simulated phishing campaign manager 230 to have failed the simulated phishing test. In implementations in which the unique identifier is included, for example, within the header of the simulated phishing message, the subject line of the simulated phishing message, the body of the simulated phishing message, or a file attached to the simulated phishing message, a reply email received by simulated phishing campaign manager 230 may also include the unique identifier within the header, the subject, the body, or an attachment of the reply to the simulated phishing message. The reply to the simulated phishing message can be processed by phishing message interaction tracker 236 to extract the unique identifier, and the unique identifier can be used to identify the original target of that simulated phishing communication. Thus, even if the reply to the simulated phishing communication is sent from an email address that is not known to be associated with the original target of that simulated phishing message, the unique identifier may be used to determine the identity of the target who replied to the email such that the failure may be attributed to the correct user.

Similarly, in implementations in which the unique identifier is included within a header of the simulated phishing communication, for example in the "From:" or "Cc:" fields of the header of the simulated phishing communication, a reply message sent by the target also will include the unique identifier within the "To:" or "Cc:" fields. The simulated phishing campaign manager 230 receives the reply message and may extract the unique identifier from the "To:" or "Cc:" fields, and the unique identifier can be used to determine the identity of the original target of the simulated phishing email.

In some implementations, the simulated phishing message may not include a unique identifier in the "From:" or "Cc:" fields, in any header field, subject line, or body of the simulated phishing message, or in an attachment to the simulated phishing message. Instead, client 102 may create, modify, or append to the reply message address (i.e., the "To:" field of the reply email a unique identifier, and the reply email may be processed by simulated phishing campaign manager 230 to extract the unique identifier to determine the identity of the original target of the simulated phishing email message. Sending a reply or forwarding a the simulated attack email, in response to receiving the simulated attack email, can be classified as a failure. Therefore, after the identity of the original target has been determined, a record of the target's failure can be stored.

In some implementations, a simulated phishing message can be sent to a large number of users. In such a situation, it may be difficult or impossible to determine the identity of the target of the simulated phishing message if when the simulated communication message is received at simulated phishing campaign manager 230. For example, if the target user replies to the simulated phishing message from an email account different from the account to which the simulated phishing message email was originally sent, then the simulated phishing campaign manager 230 cannot determine the original target through inspect of the "From:" field of the received message. In one example, a company may send a simulated phishing message to each of its employees. In embodiments, each simulated phishing message may be identical or nearly identical except for unique identifiers specific to each employee that are added by simulated phishing message generator 240 to the simulated phishing message. In one example, a simulated phishing message may be sent to the business email addresses of an employee, and the employee may reply to the simulated phishing message from their personal email account. The unique identifiers in the simulated pushing messages can facilitate the identification of the original target of the simulated phishing message regardless of the email addresses from which simulated phishing campaign manager 230 receives the message.

In some implementations, simulated phishing message generator 240 can be configured to generate a simulated phishing email. The simulated phishing message can have a "Subject:" field that is intended to be cause the recipient to take an action, such as initiating a wire transfer. In some implementations, the simulated phishing message generator 240 can generate multiple instances of the email which may be delivered to multiple users, such as a subset of all of the employees of the company. For example, the simulated phishing campaign manager 230 can select any number of employees who should be targeted by a simulated attack, and parameters corresponding to the identities of the selected targets can be stored in the memory. Simulated phishing message generator 240 can retrieve this information from the memory and can generate a set of simulated phishing messages, each addressed to a respective user identified in the information stored in the memory. That is, simulated phishing message generator 240 can generate the simulated phishing messages such that the "From:" and "Subject:" fields of each simulated phishing message are identical, while the "To:" field and the unique identifier for each simulated phishing message is adjusted according to the desired user.

After the client 102 has received a simulated attack message, client 102 can send a reply message. For example, client 102 may reply to the simulated attack message with a reply message to inform the sender of the simulated attack message that client 102 has completed a requested action, such as initiating a wire transfer. In another example, client 102 may reply to the simulated attack message with the reply message to provide other sensitive information to the sender of the simulated attack message. In some examples, the reply message to the simulated attack message includes the same "Subject:" field as the simulated attack message, however, the "To:" field of the reply message includes a unique identifier. In some implementations, the unique identifier can be included in the local part of the "To:" field of the reply message (i.e., the portion of the "To:" field of the reply message before the "@" character). In other implementations, the unique identifier can be included in the domain part of the "To:" field of the reply message (i.e., the portion of the "To:" field of the reply message after the "@" character). In still other implementations, each of the local part and the domain part of the "To:" field of the reply message can include unique identifiers. A unique identifier can be e.g., a string of letters, numbers, or special characters associated only with a particular user. Thus, all potential user can have a different unique identifier. After the reply message is sent by client 102, it can be received by the simulated phishing campaign manager 230.

The system 200 includes also the client 102. Client 102 may also be referred to as user 102, and may also be a client device or user device, and the terms client and client device may be used interchangeably. A user in the system may be referred to as a client or a client device, or a target or a target device. As described above, a user may be any target of a simulated phishing attack. For example, the target may be an employee, member, or independent contractor working for an organization that is e.g. performing a security checkup or conducts ongoing simulated phishing attacks to maintain security. Target device 102 may be any device used by the target of the simulated phishing attack. The target need not own the device for it to be considered a target device 102. Target device 102 may be any computing device, e.g. a desktop computer, a laptop, a mobile device, or any other computing device. In some implementations, target device 102 may be a server or set of servers accessed by the target. For example, the target may be the employee or a member of an organization. The target may access a server that is e.g. owned or managed or otherwise associated with the organization. Such a server may be target device 102.

In some implementations, the target device 102 may include a processor and memory. The target device 102 may further include a user interface 266 such as, e.g., a keyboard, a mouse, a touch screen, or any other appropriate user interface. This may be a user interface that is e.g. connected directly to target device 102, such as, for example, a keyboard connected to a mobile device, or may be connected indirectly to a target device 102, such as, for example, a user interface of a client device used to access a server target device 102. The target device 102 may include display 268, such as, e.g., a screen, a monitor connected to the device in any manner, or any other appropriate display.

In an implementation, the target device 102 may include a messaging application 270. Messaging application 270 may be any application capable of viewing, editing, and/or sending messages. For example, Messaging application 270 may be an instance of an application that allows viewing of a desired message type, such as any web browser, a Gmail™ application, Microsoft Outlook™, WhatsApp™, a text messaging application, or any other appropriate application. In some implementations, messaging application 270 can be configured to display simulated attack emails. Furthermore, messaging application 270 may be configured to allow the target to generate reply messages in response to simulated attack messages displayed by messaging application 270. For example, messaging application 270 may be configured to allow the target to forward simulated attach messages displayed by messaging application 270s.

In some implementations, the target device 102 may include a communications module 264. This may be a library, application programming interface (API), set of scripts, or any other code that may facilitate communications between the target device 102 and any of security awareness system server 106, security services provider 210, or any other server. In some implementations, communications module 264 determines when to transmit information from target device 102 to external servers via network 104. In some implementations, the information transmitted by communications module 264 may correspond to a simulated attack message, such as an email, generated by messaging application 270.

In implementations, the security awareness system server 106 includes learning management manager 250. Learning management manager 250 may include a database of remediation training 256. Database 256 may be integrated with learning management manager 250. In some embodiments, learning management manager 250 includes remediation training tracker 254, which may be configured to keep track of the training undertaken by each user in system 200. Remediation training tracker 254 may be configured to maintain a schedule of upcoming training to be undertaken by a user in the system. Remediation training database 256 may include training modules that are available for selection for training for users of system 200. In some embodiments, remediation training database 256 includes pointers to external training offerings which are not stored in remediation training database 256, but which are stored elsewhere in server 106 or as part of a third-party server or service. Being correctly able to identify the target user of a simulated phishing communication message may guide learning manager 250 to choose specific remedial training that addresses the mistake that the target user made which lead the target user failing the simulated phishing test.

In some implementations, system 200 includes security services provider 210. In some embodiments, this functionality is referred to as a security information management (SIM) system, security event management (SEM) system, or security information and event management (SIEM) system. Security information management (SIM), security event management (SEM), or security information and event management (SIEM) is the practice of collecting, monitoring and analyzing security-related data from computer logs, including event log data from security devices, such as firewalls, proxy servers, intrusion detection systems, intrusion prevention systems, file systems, routers, switches, and antivirus software. A security information management system (SIMS), security event management system (SEMS) or security information and event management system (SIEMS), herein collectively referred to as a security information and event management system (SIEMS), automates the process of collecting, monitoring and analyzing security-related data from computer logs, including event log data from security devices, such as firewalls, proxy servers, intrusion detection systems, intrusion prevention systems, file systems, routers, switches, and antivirus software and translates the logged data into correlated and simplified formats. SIEMS may monitor events in real-time, display a real-time view of activity, translate event data from various sources into a common format, typically XML or JSON, aggregate data, correlate data from multiple sources, cross-correlate to help administrators discern between real threats and false positives, provide automated incidence response, and send alerts and generate reports. SIEMS collect and centrally manage records of network, application, device, security, and user activity from different infrastructure sources. Reports may be defined for a SIEM, and an SIEM may also provide query functionality for both real time and historical records.

Commercial SIEM products include ArcSight ESM (Micro Focus, Newbury, England), nFX's SIM One (netForensics inc., Edison, N.J.), envision (Network Intelligence, Westwood, Mass.), EventTracker (EventTracker, Fort Lauderdale, Fla.), Trigeo (TriGeo Network Security, Post Falls, Id.), Symantec's Security Information Manager (Symantec, Mountain View, Calif.), Cisco Security Manager, MARS (Cisco, San Jose, Calif.), and Snare (Snare Solutions, Adelaide, Australia). Open source SEIM products include OSSIM, a product of the Open Source Security Information Management initiative, and Prelude, from PreludeIDS. SEIMS may use normalization, which means automatically pulling common data items from each event (like who, what, when and where) and storing this subset of information into a common format. Security awareness systems can use this common format to find records which may be relevant to users in the security awareness system.

Metasploit (Rapid7), Canvas (Immunity) and Core Impact (Core Security Technologies) are examples of vulnerability testing systems that can be used to test the vulnerability of computer systems, or to break into remote systems. Metasploit 3.0 introduces fuzzing tools which are used to discover software vulnerabilities. Metasploit can be used by securities teams who need to identify vulnerabilities in software and systems, which their users may be exposed to.

Mimecast (London, UK) is an example of a secure email gateway that provides cloud-based anti-virus and anti-spam protection as well as many other security services such as DNS Authentication services, including Sender Policy Framework (SPF), DomainKeys Identified Mail (DKIM) and Domain Message Authentication Reporting and Conformance (DMARC) to address sender spoofing, prevention against impersonation attacks, prevention against the delivery of malicious attachments through the application of multiple signature-based, static and sandboxing security inspections, protection against malicious URLs, whether they are lures to phishing or malware drop sites.

SIEMS, vulnerability testing systems, and secure email gateways can all produce information about the threats that an organization or an individual has been exposed to, which may not be apparent to the security awareness system. In some embodiments, a user may use systems or software that have been determined to be vulnerable by a vulnerability testing system. In some embodiments, a user may have received a number of attacks which have been stopped by a secure email gateway before they reached the company's email system. In some embodiments, a user may be recognized within a SIEM to be associated with one or more multiple security threats or incidents that are recorded by the SIEM.

In some embodiments, security services provider 210 is a security appliance. Security services provider 210 may be used to refer to any of the aforementioned embodiments as well as other embodiments of security services that perform the functionality presently described. Security services provider 210 may monitor events in real-time, display a real-time view of activity, translate event data from various sources into a common format, typically XML or JSON, aggregate data, correlate data from multiple sources, cross-correlate to help administrators discern between real threats and false positives, provide automated incidence response, and send alerts and generate reports. Security services provider 210 may collect and centrally manage records of network, application, device, security, and user activity from different infrastructure sources. Reports may be defined for security services provider 210, and security services provider 210 may also provide query functionality for both real time and historical records.

In the systems and methods of the present invention, security awareness system server 106 may receive information from any of the aforementioned systems and may use this information to generate additional reports and metrics related to users in the security awareness system. An API could be provided to enable the security awareness system to receive the information from the aforementioned systems in a common format. In some embodiments, a security awareness system server 106 may use information from any of the aforementioned systems in a learning management system, in order to tailor training to a specific individual.

Security services provider 210 may also include vulnerability testing systems that can be used to test the vulnerability of computer systems, or to break into remote systems. Examples of vulnerability testing systems include Metasploit (RSIMSd7), Canvas (Immunity) and Core Impact (Core Security Technologies). As a further example, Metasploit 3.0 introduces fuzzing tools which are used to discover software vulnerabilities. Metasploit can be used by securities teams who need to identify vulnerabilities in software and systems, which their users may be exposed to.

Security services provider 210 may include vulnerability testing systems, and secure email gateways can all produce information about the threats that an organization or an individual has been exposed to, which may not be apparent to the security awareness system. In some embodiments, a user may use systems or software that have been determined to be vulnerable by a vulnerability testing system. In some embodiments, a user may have received a number of attacks which have been stopped by a secure email gateway before they reached the company's email system. In some embodiments, a user may be recognized within a SIEM to be associated with one or multiple security threats or incidents that are recorded by the SIEM.

System 200 may include artificial intelligence machine learning system 215. Artificial intelligence machine learning system 215 may contain frequency calculator 201, propensity calculator 202 and severity calculator 203. In some embodiments, artificial intelligence machine learning system 215 includes models that are configured to predict user responses to malicious attacks based on data of the three calculators in order to create an individual risk score. In some embodiments, data of the three calculators is integrated in order to create an individual risk score. In some embodiments, data collection is performed on an ongoing basis, and updated data and/or data sets may be used to re-train machine learning models or create new machine learning models that evolve as the data changes. Artificial intelligence machine learning system 215 may receive data from simulated phishing campaign manager 230, learning management manager 250, user group management manager 220, security services provider 210, or other external sources. Artificial intelligence machine learning system 215 may be part of server 106, may be hosted separately on a different server, or on cloud 108. In another embodiment, artificial intelligence machine learning system 215 may calculate aggregate group risk scores derived from one or more individual risk scores.

System 200 may include network 104. Network 104 may be any type and/or form of network. The geographical scope of network 104 may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. Network 104 may be a type of a broadcast network, a telecommunications network, a data communication network, or a computer network.

Referring to FIG. 3, in a general overview, FIG. 3 depicts a method for establishing a risk score. In step 302, artificial intelligence machine learning system 215 determines a frequency score to predict a frequency at which a user is to be hit with a malicious attack. In step 304, artificial intelligence machine learning system 215 determines a propensity score that identifies a propensity of the user to respond to the hit of the malicious attack. In step 306, artificial intelligence machine learning system 215 determines a severity score that identifies a severity of the user's response to the hit of the malicious attack. In step 308, artificial intelligence machine learning system 215 establishes a risk score of the user based at least on the frequency score, the severity score and the propensity score. In step 310, based on the risk score, artificial intelligence machine learning system 215 displays a probability that the user will respond to a subsequent hit of a type of malicious attack at a point in time.

Referring to FIG. 3 in more detail, In step 302, artificial intelligence machine learning system 215 determines a frequency score to predict a frequency at which a user is to be hit with a malicious attack. In some embodiments, artificial intelligence machine learning system 215 determines a frequency score based on a job score. The job score may comprise a value based on a type of job. In examples, artificial intelligence machine learning system 215 determines a frequency score based on a breach score. The breach score the may comprise a value identified based on the user's level of exposure to email.

In embodiments, the risk score of an individual may be represented as:

$$\text{Risk Score (RS)} = f\{f(H), p(R|H), s(R,H)\} = RS(f,p,s)$$

where:
H=a hit, defined as any kind of malicious attack
f(H)=frequency of potential harmful hits H
p(R|H)=the propensity that an individual will respond to a hit H
R=individual response, e.g. a click, reply, etc.
s(R,H)=the severity of the impact of response R to hit H
subject to constraints:

$$RS(0,0,0) \geq 0$$

$$RS(1,1,1) = 100$$

In some embodiments, RS(f, p, s) is an increasing function of each of its variables: f, p, and s.

In some embodiments, responses can include a multitude of user actions, for example but not limited to a user opening a message, clicking on a link in a message, replying to a message, opening an attachment to a message, enabling a macro in a message, entering data in response to a message, reporting a message, or forwarding a message. In some examples, data about responses may be aggregated, or temporal information may be included, for example the number of days since a user last responded, or how many instances of each type of response (or any type of response) in the last e.g. 30 days, 3 months, 1 year, etc.

In some embodiments, the training and learning history of a user may be partitioned based on the type of course or module that the user performed. In some examples, the training history may be divided into short modules (less than a predetermined duration) or long modules (greater than a predetermined duration). In some examples, training history may be divided based on the type of training, for example classroom training or online training. Training history may include courses that the user is enrolled in by the system, courses that the user has chosen to enroll in voluntarily, courses that the user has started, or courses that the user has completed. Training history may include the time interval between completed training courses.

In some embodiments, user data may be arranged in a tabular format, whereby the rows of the table represent a phish instance for a user which may include a detailed representation of the user and their phishing and training history at a given point of time. In some embodiments, when training a risk score model, the system uses information in a table to learn how the user responded to a specific attack given their history at the time of the attack.

A component of the risk score calculation is f(H), which reflects the frequency at which individuals are hit with a malicious attack (H). In some embodiments, this information is based on two proxies in the data, job score and breach score. In some embodiments, job score may be defined as follows:

$$\text{Job Score (job title)} = J = (0,5,6,10)$$

where:
0=does not match a category or no information available
5=accounting or IT
6=high level, e.g. manager, director, lead
10=executive, e.g. C×O
It is understood that these example job classifications are demonstrative, and any job classifications may be used, and more or fewer job scores may be enabled.

In some embodiments, a breach score may be based on an email exposure check (EEC) threat level, for example a breach score may be defined as follows:

$$\text{Breach Score (EEC)} = B = (0,3,10)$$

where:
0=the user has negligable email exposure
3=the user has moderate email exposure
10=the user has high email exposure
It is understood that these example breach scores are demonstrative, and any breach scores may be used, and more or fewer breach scores may be enabled.

In some embodiments, breach score information may be decayed over time. In some examples, the data supporting the breach score inputs may be sparse, or in some examples the users may not have a job title which fits into any of these categories, in which case f(H) may take on a baseline value.

In step 304, artificial intelligence machine learning system 215 determines a propensity score that identifies a propensity of the user to respond to the hit of the malicious attack. In embodiments, the propensity score is based at least on training a predictive model with an input of the user history of whether or not the user responded with a type of response for a given hit of the malicious attack.

In some embodiments, the propensity p(R|H) represents the predictive model component of the risk score RS. In some examples, this value may be produced by:
a. Training statistical and neural network models to learn the mapping from a particular user history (input features) to whether or not the user responded (response R) on a given malicious attack (H).
b. After repeated exposure to millions of samples, the models are able to learn to predict with some success whether or not users with given malicious attack and training histories are likely to perform a response R given an attack H.

c. Given enough training data, models are able to predict a variety of different user responses R to a variety of different attacks H.

In some embodiments, the model's output, p(R|H) is the probability that a given user will respond, for example click, in response to a malicious attack, for example a phishing email, at a particular point in time. The same user may exhibit a different p at a later time. To evaluate the predictive performance of the model, we need more than one malicious attack, which allows the model to predict the click rate of a user over a period of time and compare it to the user's actual click rate over that period of time. For example, assume the period of time is one year. For each user, calculate the predicted p(R|H) each time a phishing email hits over one year and record whether or not the user clicked. p(R|H) is harder to predict and more variable for users with few phish events. The more phish data that is available about a user, the more accurate the risk score RS becomes. In some embodiments, the performance of the model is assessed by predicting the number of clicks instead of the percentage over a period of time and comparing it to the user's actual clicks over that period of time.

The value of p(R|H) is a very good predictor in the aggregate for a group of users with similar profiles. When users are categorized by their predicted p(R|H) value, the percent of actual clicks in each category closely tracks the predicted p(R|H) value for the category. Uncertainties at the individual level get smaller when groups of individuals are aggregated. The propensity component p(R|H) of the risk score RS becomes more predictive as the number of phish events increases. In some embodiments, this can be achieved by taking multiple events into account for each user. In embodiments, this can be achieved by aggregating the expected click rate at the level of a group. In step 306, artificial intelligence machine learning system 215 determines a severity score that identifies a severity of the user's response to the hit of the malicious attack. In examples, the severity score may be based at least on the job score. In some examples, the severity score may be based at least on a user's individual access.

In some embodiments, user training histories are used in predicting p(R|H) values. When more users have had training, p(R|H) is low, and when fewer users have had training, p(R|H) is high. In some examples, when users have had training recently, p(R|H) is low.

In some examples, calculation is the severity s(R, H) reflects the severity of the user response R to malicious attack or hit H. In some embodiments s(R, H) may be a function of individual access. In some embodiments, the severity may be a function of the user's job score. In some embodiments, the severity may by a function of a risk booster value, which may be set by a company or system administrator to customize the assessed risk of individuals or of groups of individuals. In some embodiments, severity score may be defined as follows:

$$s(R,H) = (-1, 0, 1, 10)$$

where:
−1=below normal risk
0=normal risk (default)
1=elevated risk
10=very high risk It is understood that these example severity score classifications are demonstrative, and any severity score classifications may be used, and more or fewer severity scores may be enabled.

In step 308, artificial intelligence machine learning system 215 establishes a risk score for the user based at least on the frequency score, the severity score and the propensity score. In embodiments, artificial intelligence machine learning system 215 establishes a risk score model as a function of the frequency score the propensity score, and the severity score. In examples, the function of the frequency score the propensity score, and the severity score may utilize a weighted or logarithmic function.

In some embodiments, several different processes or workflows are involved in the prediction of risk score. In some embodiments, data are divided up into groups, and a percentage of the data is used for training, a percentage of the data is used for validation, and a percentage of the data is used for text. In one examples, 80% of the data is used for training, 10% of the data is used for validation, and 10% of the data is used for test. In some embodiments, data from archived users may be used for any of training, validation or testing of the model. In some embodiments, the model is updated, trained or retrained periodically as new data enters the system. In some embodiments, this may be updated daily, weekly, monthly, or yearly. In some embodiments, users may be added to or removed from groups that are used to train the models. For example, a user may more from one job level to a different job level, and all users of a given job level are being used to train a model for use with that job level. In this example, the user that moved job level would be removed from the group of users used to train, validate or test the model for that job level.

The components of RS—f, p, and s, represent the expected loss due to malicious attacks over a period of time. The function RS(f, p, s) in some embodiments may be represented as a weighted sum of logarithms:

$$RS(f,p,s) = w_1 \log f + w_2 \log p + w_3 \log s$$

In some embodiments, the function RS(f, p, s) may be represented as follows:

$$RS(f, p, s) = w_1 \log(1 + J + B) + w_2 \log(1 + P(R|H)) + \frac{w_3 \log\left((1+J)\left(1.5 + \frac{RB}{2}\right)\right)}{d}$$

where:
$w_i$=settable parameters, normalized so that $0 \leq RS \leq 100$
J=job score (0, 5, 6, or 10)
B=breach score (0, 3, or 10)
RB=severity (s)(−1,0,1,10)
and:

$$d = \frac{\log(21 + 100\log(2) + \log(11 \times 6.5))}{100} = 0.77 \text{ when } w_i = 1$$

In embodiments, artificial intelligence machine learning system 215 may establish a group risk score based on a function of risk scores of each user within the group. The use of the highest individual risk score in a group at the risk score for the group is not recommended as it puts too much weight on one single estimate. The average over all individual risk scores in the group is one possible approach to aggregating the risk scores, however this may tend to underestimate the contribution of isolated outliers. In some examples, the approach taken may be referred to as using the standard distance to the perfect score (0), described as follows:

$$RS(\text{group}) = \sqrt{\frac{1}{N}\sum_{i=1}^{N}(RS(i)^2)}$$

where:
N=number of group members
RS(i)=individual risk score of member i
As an example, consider the case where N=100, RS(1)=100, and RS(i)=0, i=2: 100. Then, $RS_{max}$=100, $RS_{average}$=1, and $RS_{group}$=10.

In step 310, based on the risk score, artificial intelligence machine learning system 215 displays a probability that the user will respond to a subsequent hit of a type of malicious attack at a point in time.

Figure 4:
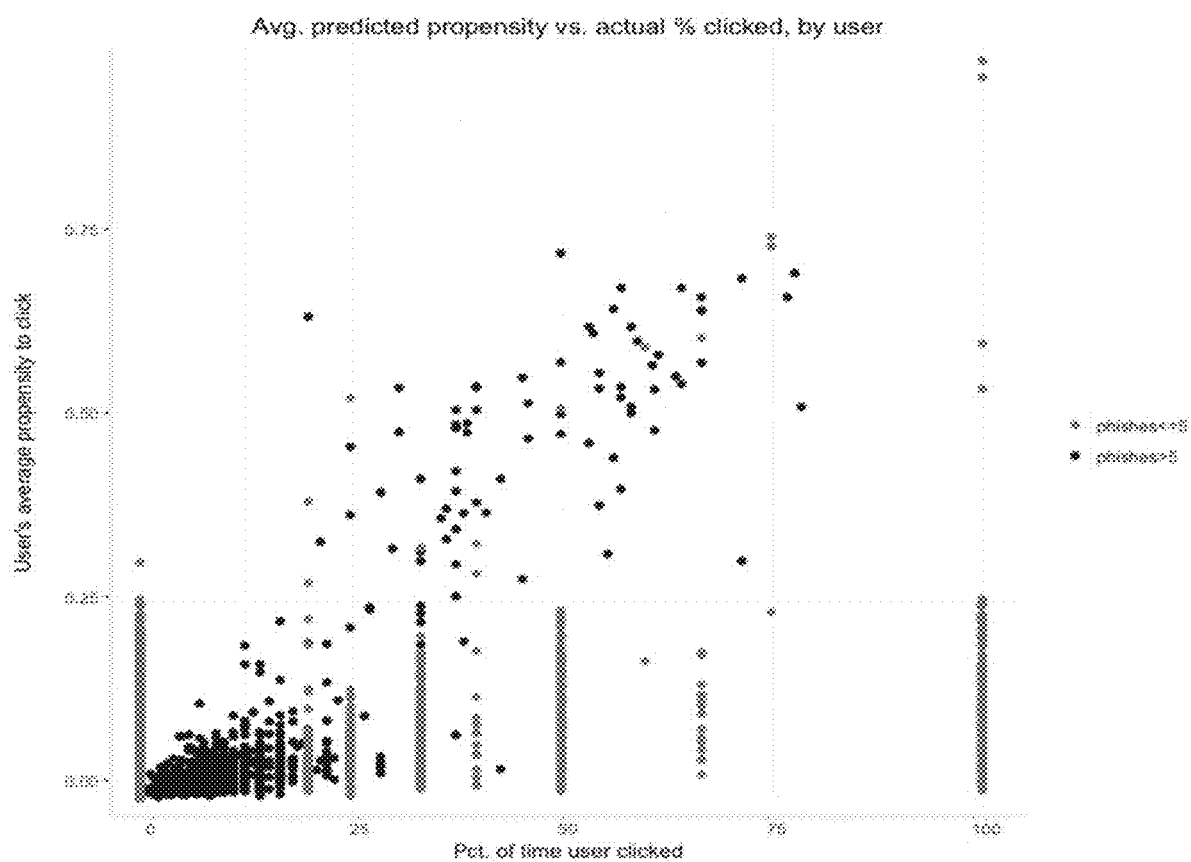
FIG. 4 illustrates the predictive performance of the model to calculate risk scores.

Referring to FIG. 4, in general overview, FIG. 4 illustrates the predictive performance of the model to calculate p(click|H) or a user's risk score. The model's output p(click|H) is the probability that a given user will click in response to a phishing email at a particular point in time. In some embodiments, the same user may exhibit a different p at a later point in time. In FIG. 4, the click rate of a user over a period of time is calculated and compared to the user's actual click rate over that period of time to evaluate the predictive performance of the model. The greater the number of phish data samples per user, the more accurately the risk score predicts the user's actual behavior.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
   (a) determining, by one or more servers, a frequency score to predict a frequency at which a user is to be hit with a malicious attack;
   (b) determining, by the one or more servers, a propensity score that identifies a propensity of the user to respond to the hit of the malicious attack;
   (c) determining, by the one or more servers, a severity score that identifies a severity of the user's response to the hit of the malicious attack;
   (d) establishing, by the one or more servers, a risk score for the user, the risk score established as a function of the frequency score, the severity score and the propensity score, wherein the function comprises one of a weighted or logarithmic function; and
   (e) displaying, by the one or more servers based at least on the risk score, a probability that the user will respond to a subsequent hit of a type of malicious attack at a point in time.

2. The method of claim 1, wherein (a) further comprise determining the frequency score based at least on a job score and a breach score.

3. The method of claim 2, wherein the job score comprises a value identified based on a type of job.

4. The method of claim 2, wherein the breach score comprises a value identified based on the user's level of exposure to email.

5. The method of claim 1, wherein (b) further comprises determining the propensity score based at least on training a predictive model with an input of the user history of whether or not the user responded with a type of response for a given hit of the malicious attack.

6. The method of claim 1, wherein (c) further comprises determining the severity score based at least on a job score.

7. The method of claim 1, wherein (c) further comprises determining the severity score based at least on individual access of the user.

8. The method of claim 1, further comprising establishing a group risk score based on a function of risk scores of each user within the group.

9. A system comprising:
   one or more servers comprising one or more processors and configured to:
      determine a frequency score to predict a frequency at which a user is to be hit with a malicious attack;
      determine a propensity score that identifies a propensity of the user to respond to the hit of the malicious attack;
      determine a severity score that identifies a severity of the user's response to the hit of the malicious attack;
      establish a risk score for the user, the risk score established as a function of the frequency score, the severity score and the propensity score, wherein the function comprises one of a weighted or logarithmic function; and display, based at least on the risk score, a probability that the user will respond to a subsequent hit of a type of malicious attack at a point in time.

10. The system of claim 9, wherein the one or more servers are further configured to determine the frequency score based at least on a job score and a breach score.

11. The system of claim 10, wherein the job score comprises a value identified based on a type of job.

12. The system of claim 10, wherein the breach score comprises a value identified based on the user's level of exposure to email.

13. The system of claim 9, wherein the one or more servers are further configured to determine the propensity score based at least on training a predictive model with an input of the user history of whether or not the user responded with a type of response for a given hit of the malicious attack.

14. The system of claim 9, wherein the one or more servers are further configured to determine the severity score based at least on a job score.

15. The system of claim 9, wherein the one or more servers are further configured to determine the severity score based at least on individual access of the user.

16. The system of claim 9, wherein the one or more servers are further configured to establish a group risk score based on a function of risk scores of each user within the group.

* * * * *